United States Patent [19]

Isono et al.

[11] Patent Number: 4,876,456
[45] Date of Patent: Oct. 24, 1989

[54] METHOD OF AND APPARATUS FOR DETECTING PRESENCE OR ABSENCE OF PHOTOSENSITIVE OBJECT AT A PRESCRIBED POSITION

[75] Inventors: Koichi Isono; Ikuo Sho, both of Hikone, Japan

[73] Assignee: Dainippon Screen Mfg. Co., Ltd., Kyoto, Japan

[21] Appl. No.: 136,488

[22] Filed: Dec. 21, 1987

[30] Foreign Application Priority Data

Dec. 19, 1986 [JP] Japan .................................. 61-304735

[51] Int. Cl.[4] ............................................. G03D 13/00
[52] U.S. Cl. ..................................................... 250/561
[58] Field of Search .................. 250/560, 561; 354/298

[56] References Cited

U.S. PATENT DOCUMENTS 4,021,832 5/1977 Krehbiel et al. ..................... 250/560
4,566,016 1/1986 Masuda ................................ 346/108

FOREIGN PATENT DOCUMENTS 59-22431 2/1984 Japan .

Primary Examiner—Richard A. Rosenberger
Attorney, Agent, or Firm—Lowe, Price, LeBlanc, Becker & Shur

[57] ABSTRACT

Photosensors having light emitting elements and light receiving elements are provided in a path for carrying a film. The light emitting elements emit periodic pulsed light. When the film is present in the positions of the photosensors, the periodic pulsed light is reflected by the film to enter the light receiving elements, whereby presence of the film is detected. Activation time and activation interval of the light emitting elements for generating the periodic pulsed light are determined so that accumulated exposure value in each portion on the film is less than a critical exposure value of photosensitive material provided in the film.

9 Claims, 14 Drawing Sheets

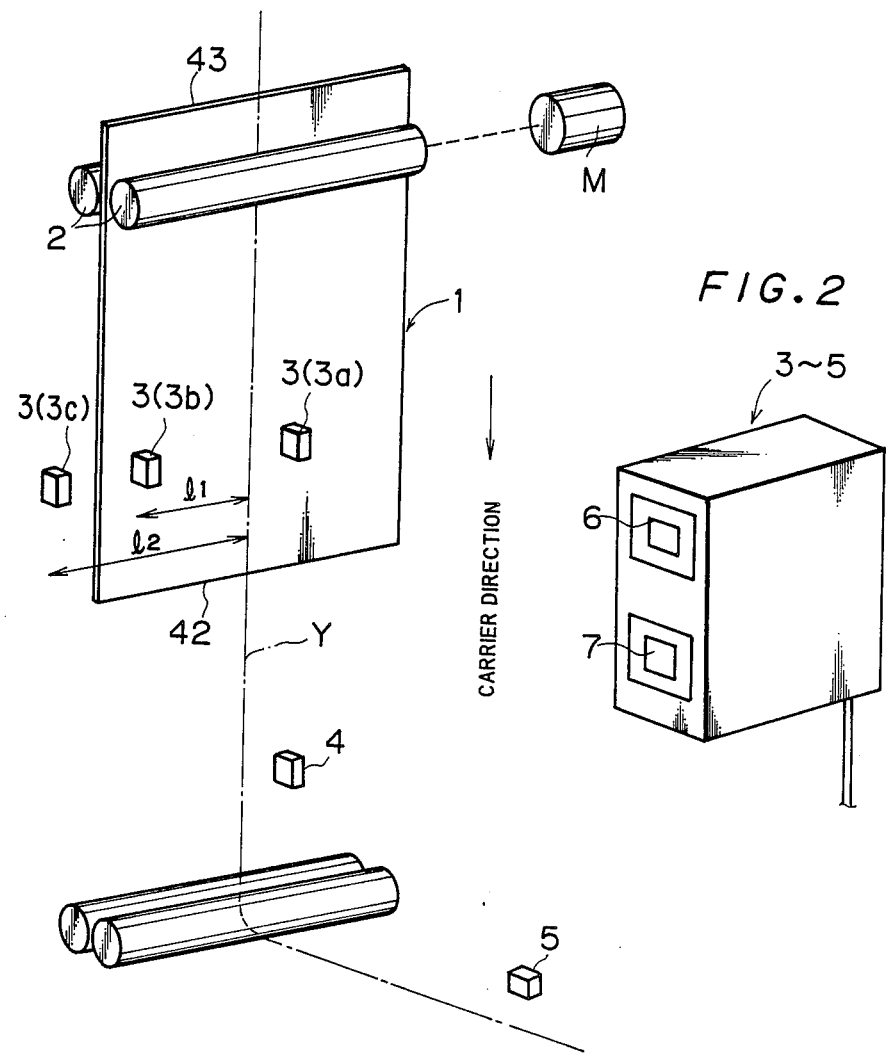

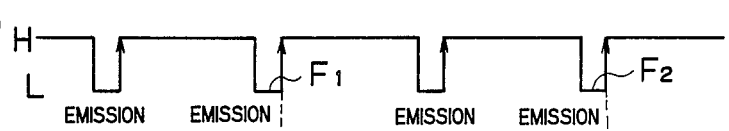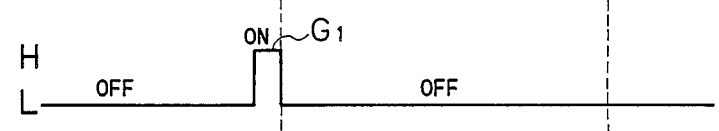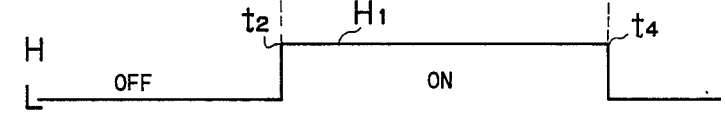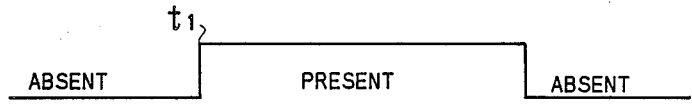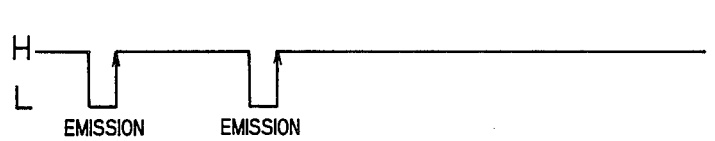

METHOD OF AND APPARATUS FOR DETECTING PRESENCE OR ABSENCE OF PHOTOSENSITIVE OBJECT AT A PRESCRIBED POSITION

BACKGROUND OF THE INVENTION

1. Field of the Invention

The present invention relates to a method of and an apparatus for optically detecting presence or absence of a photosensitive object, such as a photographic process film, at a prescribed position of a path carrying the photosensitive object.

2. Description of the Prior Art

In the field of photographic process or the like, it is generally required to automatically convey a photographic film to a setting position. Therefore, employed is a photosensitive object detecting apparatus for detecting presence or absence of the film at a prescribed position thereby to detect the position and width of the film. Such a photosensitive detecting apparatus is constructed in a contact type apparatus employing a microswitch etc. or in a non-contact type apparatus employing light or supersonic waves. Within these types of apparatus, the former tends to spoil the film.

Therefore, generally employed is a photosensitive object detecting apparatus of the non-contact type, which is most importantly represented by an apparatus of an optical type capable of accurate detection. In the apparatus of the optical type, however, detection light must necessarily be applied to the photosensitive object, whereby a latent image is inevitably sensitized by the detection light. In order to prevent this sensitization, detection light outside a photosensitive wavelength band of the film may be employed, and hence near infrared rays are mainly employed as detection light for a film for general use. However, image process equipment utilizing semiconductor laser etc. employ an infrared-photosensitive film, such as a process infrared film, which is inevitably sensitized if ordinary near infrared light is utilized.

However, a light emitting element which emits light having a non-photosensitive wavelength with respect to such a film (wavelength of a far-infrared band for a process infrared film, for example) is generally high-priced, so that the cost of photosensitive object detecting apparatus employing the same is increased.

SUMMARY OF THE INVENTION

The present invention is directed to an apparatus for optically detecting a photosensitive object having a photosensitive material carried along a prescribed path in a prescribed position along the path, which apparatus comprises: light emitting means provided oppositely to the prescribed position; power supply means for supplying pulse power to the light emitting means thereby to activate the light emitting means to emit pulsated light, in which activation time and activation interval of the pulse power is determined to satisfy a condition whereby accumulated exposure value in each portion on the photosensitive object is less than a critical exposure value of the photosensitive material, depending on a photosensitive character of the photosensitive material, when the pulsed light is applied to the photosensitive object being moved; and light receiving means facing the prescribed position for receiving the pulsed light thereby to generate a photosensitive object detection signal for indicating whether or not the photosensitive object is present at the prescribed position.

The present invention also provides a method of detecting edges and width of the photosensitive object through the aforementioned apparatus. Since the activation time and the activation interval of the pulsed power for generating the pulsed light are determined on a condition that the accumulated exposure value in each portion on the photosensitive object is less than a critical exposure value, the photosensitive object is detected without generation of a latent image.

The term "critical exposure value" in the present invention is employed to indicate the upper limit value of accumulated exposure value that does not substantially sensitize the employed photosensitive object. The "critical exposure value" depends on the type of the photosensitive material and the wavelength of the light emitted from the light emitting means.

Accordingly, an object of the present invention is to provide a low-priced photosensitive object detecting apparatus which can detect the presence or absence of a photosensitive object without substantial sensitizing of the photosensitive object and a method of detecting edges and width of the photosensitive object employing the apparatus.

These and other objects, features, aspects and advantages of the present invention will become more apparent from the following detailed description of the present invention when taken in conjunction with the accompanying drawings.

DESCRIPTION OF THE DRAWINGS

FIG. 1A is a partial overview of an embodiment of the present invention;

FIG. 2 is a perspective view of a photosensor;

FIGS. 8(a) through 9(d) are timing charts of operation for detecting a forward edge through pulsed emission of light;

DESCRIPTION OF THE PREFERRED EMBODIMENT

Figure 1B:
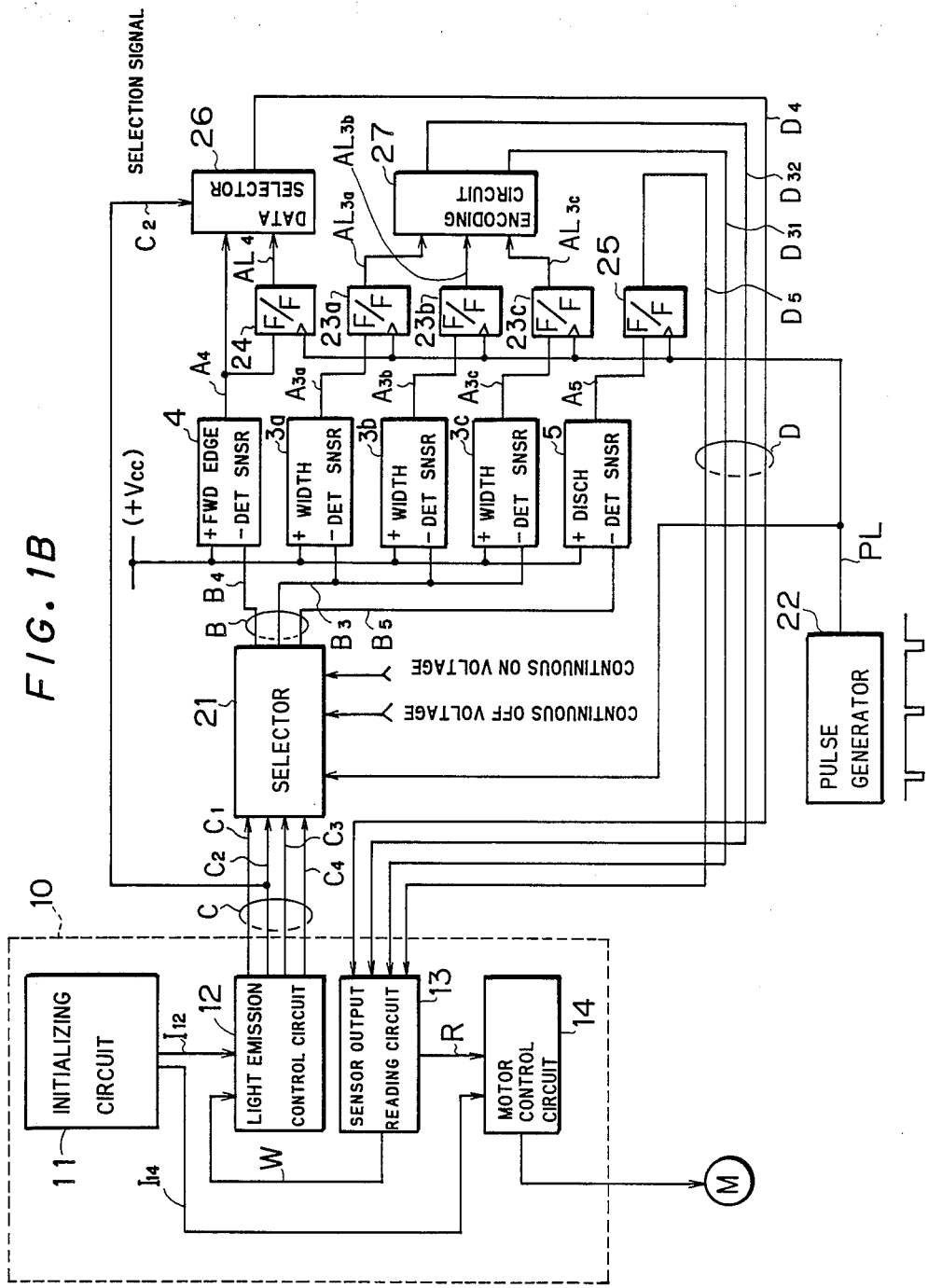
FIG. 1B is a block diagram showing the embodiment in more detail.

FIG. 1 is a partial arrangement diagram of a preferred embodiment of the present invention. FIG. 1B is a block diagram showing the preferred embodiment in detail. This embodiment is structured as an apparatus for performing edge detection and width detection of a photosensitive process film 1 having photosensitive material, which apparatus is assembled in a process camera (not shown). The film 1 is initially located in an upper position of FIG. 1A, to be downwardly carried for exposure. Rollers 2 are provided in the path for feeding the film 1, which rollers 2 are rotated by a motor M to feed the film 1.

Figure 3A:
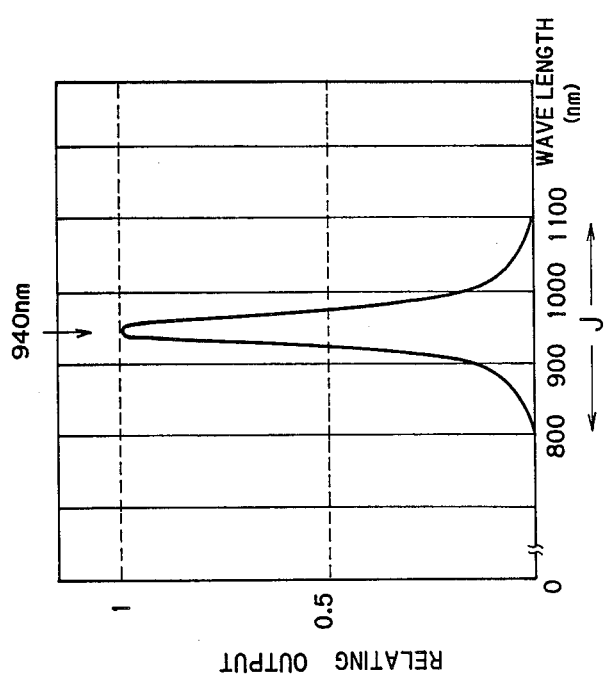
FIGS. 3A and 3B are a light emission characteristic diagram of a light emitting element and a photosensitive spectrum characteristic diagram of a film.
Figure 3B:
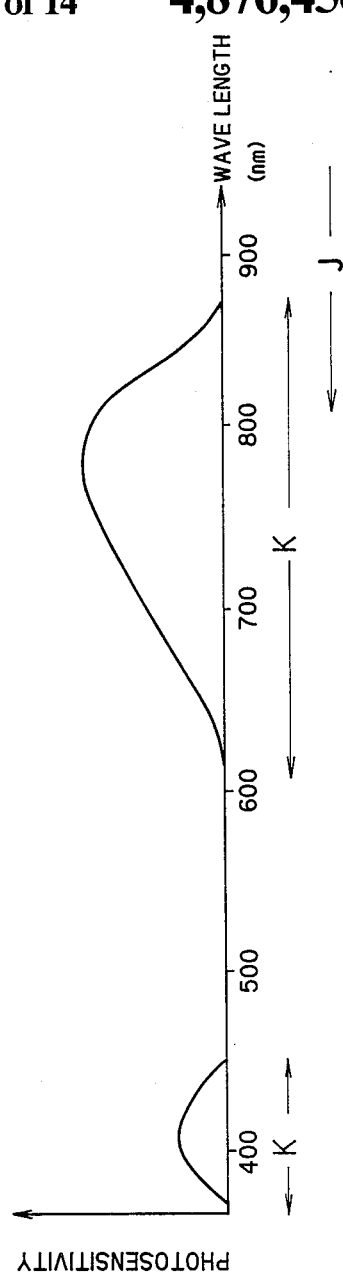

Five photosensors 3 (3a to 3c), 4 and 5 are provided at prescribed positions along the path. Each of the photosensors 3 to 5 has a light emitting element 6 and a light receiving element 7 as shown in FIG. 2, to be substantially similar in structure to a so-called reflection type photoelectric switch. When the film 1 is in a position opposite the light emitting element 6, light emitted from the light emitting element 6 is reflected by the film 1 to enter the light receiving element 7. When there is no film 1, light from the light emitting element 6 does not reach the light receiving element 7. Namely, the light receiving element 7 optically detects whether or not the film 1 is present in an emission path of the light from the light emitting element 6. In this embodiment, the light emitting element 6 is prepared by a light emitting diode which emits a light having wavelength band J, shown in FIG. 3A. The film 1 has a photosensitive material whose photosensitive spectrum "photosensitive character" is shown in FIG. 3B, for example. The wavelength band J of the light emitted from the light emitting element 6 partially overlaps with photosensitive wavelength areas K of the film 1.

Within the photosensors 3 to 5, photosensors 4 and 5 are provided for forward edge direction and discharge detection (terminating end detection) of the film 1, and arranged to face the center line Y (FIG. 1A), which is a reference line of the film carrying path. The remaining photosensors 3a to 3c are adapted to detect the width of the film 1. The photosensor 3a is arranged to face the carrier center line Y, while the other two photosensors 3b and 3c are arranged in positions displaced by prescribed distances $l_1$ and $l_2$ from the carrier center line Y, respectively. The photosensors 3a to 3c, 4 and 5 are hereinafter referred to as "width detecting sensors", "forward edge detecting sensor" and "discharge detecting sensor", respectively.

Referring to FIG. 1B, the photosensitive object detecting apparatus has a detection control circuit 10 which performs light emission control and light receiving signal processing suitable for purposes of the aforementioned photosensors 3 to 5. This detection control circuit 10 is provided with a light emission control circuit 12 for performing light emission control of the light emitting elements 6 in the photosensors 3 to 5, and light emission control signals C from the light emission control circuit 12 are outputted to a selector 21.

Figure 4:
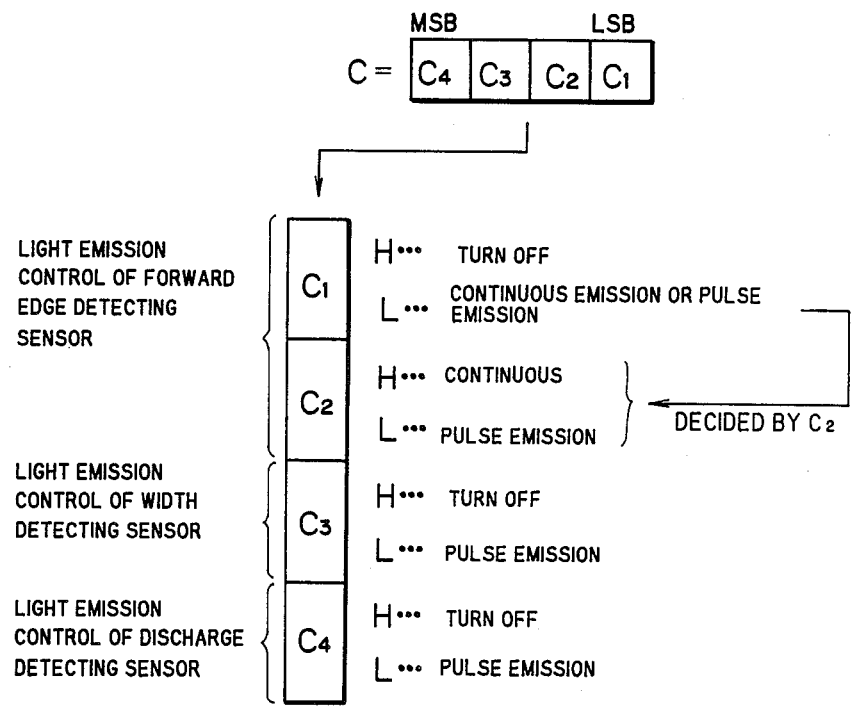
FIGS. 4 and 5 are diagrams illustrating formats of signals in the preferred embodiment.

The light emission control signals C are four-bit signals for indicating which light emitting element within the photosensors 3 to 5 is activated to emit light in what mode. As shown in FIG. 4, the light emission modes (pulse light emission, continuous light emission and turn-off) of the respective photosensors 3 to 5 are indicated by logical combination of levels "H" and "L" of respective bits $C_1$ to $C_4$ of the light emission control signals C.

In response to the light emission control signals C, the selector 21 supplies one of a continuous ON voltage (0 [V]), a continuous OFF voltage ($V_{CC}$ [V]) and a periodic pulse voltage PL to respective ones of the light emitting elements 6 in the photosensors 3 to 5 as light emission signals B ($B_3$ to $B_5$). The pulse voltage PL is generated from a pulse generator 22, with pulse width (activation time of the photosensors 3 to 5) and pulse interval (activation interval of the photosensors 3 to 5) being set in accordance with a rule as hereinafter described.

These photosensors 3 to 5 are biased by electric potential ($+V_{CC}$) from an electric supply (not shown). Therefore, when the continuous ON voltage (0 [V]) is supplied as the light emission signal $B_4$, for example, continuous light emission power is supplied to the photosensor 4 since voltage between the electric potential from the supply and zero potential is applied to the photosensor 4. Further, when the pulsed light emission voltage PL is supplied to the photosensor 4, periodic pulsed light emission power is supplied to the photosensor 4. Therefore, a DC power supply (not shown) for providing the potential ($+V_{CC}$) forms means for supplying continuous power, while a combination of the aforementioned power supply and the pulse generator 22 form means for supplying pulsed power.

The photosensors 3 to 5 are provided in their subsequent stages with flip-flop circuits (hereinafter referred to as "F/F circuits") 23a to 23c, 24 and 25 for latching light receiving signals $A_{3a}$ to $A_{3c}$, $A_4$ and $A_5$ generated at the light receiving elements 7 in the photosensors 3 to 5 by converting received lights to electric signals, respectively. Further, the F/F circuits 24 and 23a to 23c are provided in their subsequent stages with data selector 26 and an encoding circuit 27 having functions as hereinafter described, respectively.

Figure 5:
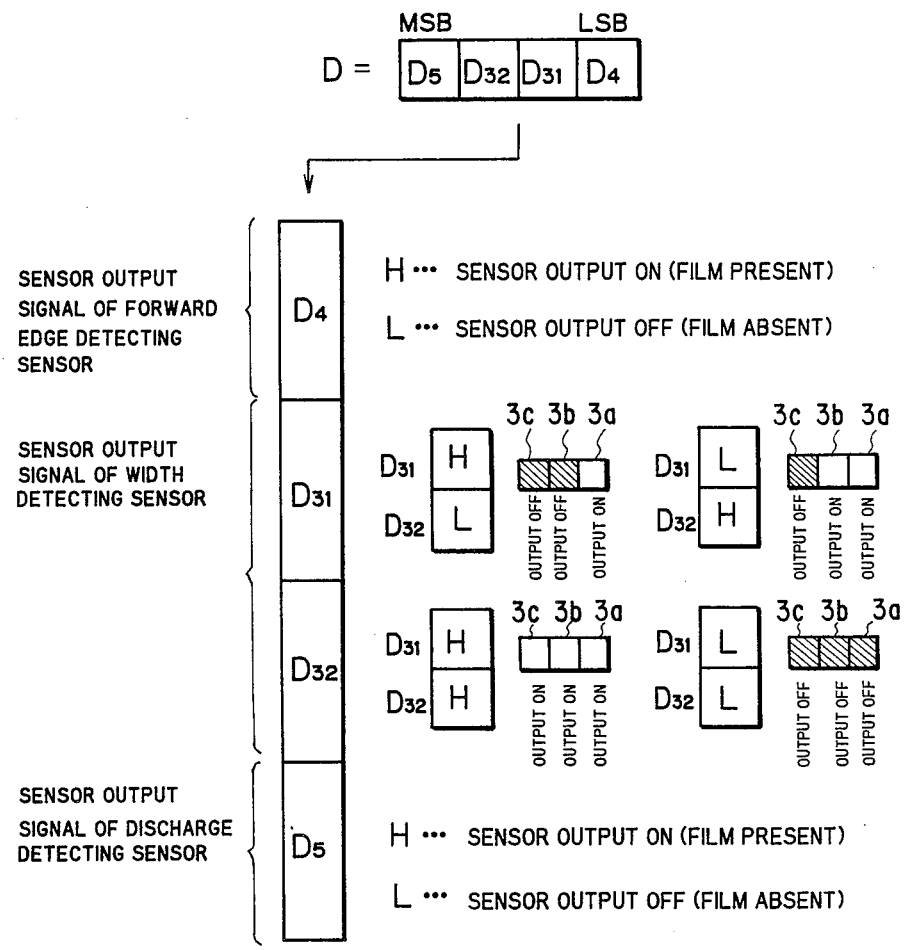

Sensor output signals D (photosensitive material detecting signals) having four bits and passing through these circuits are supplied to a sensor output reading circuit 13. FIG. 5 shows the contents indicated by logical levels "H" and "L" of the sensor outputs D ($D_{31}$, $D_{32}$, $D_4$ and $D_5$).

On the other hand, the sensor output reading circuit 13 performs detection of the film 1 (FIG. 1A) on the basis of the logical levels of the sensor output signals D, to provide a light emission switching signal W and a motor control signal R to the light emission control circuit 12 and a motor control circuit 14, respectively, in response to the result of the detection. An initializing circuit 11 supplies initializing signals $I_{12}$ and $I_{14}$ to the light emission control circuit 12 and the motor control circuit 14, respectively.

B. Pulse Voltage PL

Figure 6:
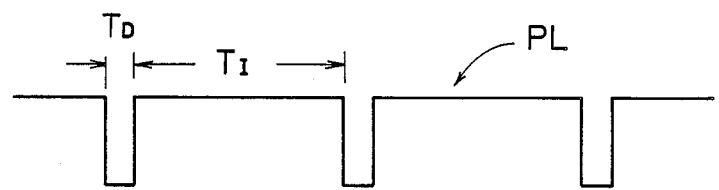
FIG. 6 is a diagram of a pulsed signal.

Description is now made of the rule to establish the desired periodic pulse voltage PL waveform. The pulse voltage PL is formed as a periodic pulse train having activation time $T_D$ and activation interval $T_I$, as shown in FIG. 6. The pulse voltage PL is employed to cause one of the light emitting elements 6 in the photosensors 3 to 5 to perform pulse light emission. Therefore, the activation time $T_D$ and the activation interval $T_I$ are so set that accumulated exposure value of each portion (each photosensitive position) of the film 1 under the carriage by light from the light emitting element 6 is less than a critical exposure value which is known from the photosensitive characteristic of the film 1. The term "critical exposure value" means the upper limit value of accumulated exposure, by which a photosensitive object (film 1) is not substantially sensitized. This is achieved by setting the activation time $T_D$ and the activation interval $T_I$ in consideration of the following relation, for example. In the following description, only the forward end detecting sensor 4 is considered, for example, but the following relation is common to the respective photosensors 3 to 5.

Figure 7:
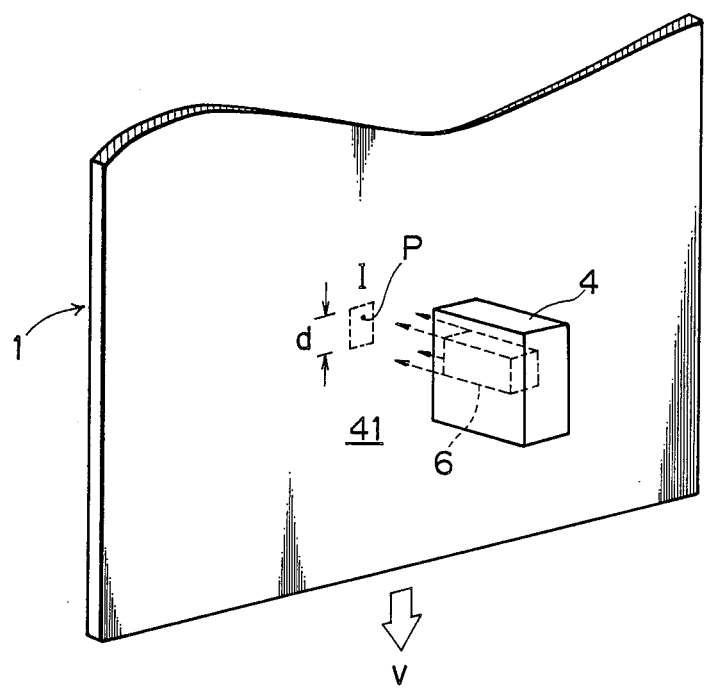
FIG. 7 is a diagram for explaining how accumulated value is obtained.

Consider a film 1 which is being downwardly carried at a velocity V, as shown in FIG. 7, and assume that the symbol I represents the amount of light energy per second of detection light $L_1$ which is applied on a photosensitive surface 41 of the film 1. Assume further that the symbol d represents the width (diameter) of the detection light L in the carrying direction and that the symbol $X_0$ represents a critical exposure value of the film 1. Then, the photosensitive position P in FIG. 7 is subjected to the exposure of:

$$X_1 = IT_D \qquad (1)$$

per one pulse emission. The time T required for passage of the photosensitive position P through a section of the width d by the carriage of the film 1 is:

$$T = d/V \qquad (2)$$

Then, the photosensitive position P is subjected to pulsed light emission of:

$$N = T/(T_D + T_I) \qquad (3)$$

times during the time T.

As a result, the accumulated exposure value X in the photosensitive position P is:

$$X = X_1 N = (I\, T_D\, T)/(T_D + T_I) \qquad (4)$$

From the condition that the accumulated exposure value X in each photosensitive position is less than the critical exposure value $X_0$, the following expression (5) or an expression (6) equivalent thereto can be obtained:

$$(I\, T_D\, T)/(T_D + T_I) \leq X_0 \qquad (5)$$

$$[\overline{(Id/V)} - X_0]T_d \leq X_0\, T_I \qquad (6)$$

The critical exposure value $X_0$ has a value depending on the photosensitive character of the photosensitive material of the film 1, which is determined both from the type of photosensitive material provided in the film 1 and the wavelength of the light. When the time T required for passage of the photosensitive position P through the section of the width d is shorter than the light emission period, i.e., activation period $(T_D + T_I)$, an expression $N \leq 1$ is obtained and hence a relation $X \leq X_1$ is found the expression (4). In this case, therefore, the activation time $T_D$ may be decided to satisfy:

$$TD \leq X_0/I \qquad (7)$$

from the condition of $X_1 \leq X_0$.

In this example, it is assumed that $d \approx 6$ mm, $V = 8.4$ mm/sec. and $(T_D + T_I) = 1$ sec. Therefore, $$T = 6/8.4 = 0.71\ [\text{sec.}] < 1[\text{sec.}] \qquad (8)$$

holds and the activation time $T_D$ may be set by the expression (7).

Therefore, when $(X_0/I) = 0.2$, for example, it may be calculated that $T_D \leq 0.2$ [sec.] from the expression (7), and preferably the activation time $T_D$ is determined to be less by several multiples of tens than the value obtained by $(X_0/I)$. In this embodiment, it is calculated that $T_D = 1$ [msec.] with respect to the case of $(X_0/I) = 0.2$ to 0.3.

C. Forward Edge Detecting Operation (Pulse Light Emission)

Under the aforementioned conditions, description is now made on a procedure detecting the film forward edge 42 of FIG. 1A using periodic pulse light emission. In operation, the initializing circuit 11 of FIG. 1B first generates the initializing signals $I_{12}$ and $I_{14}$. Thus, the motor M is rotated to start movement of the film 1, while light emission control circuit 12 outputs a light emission control signal:

$$C = \text{``}C_4 C_3 C_2 C_1\text{''} = \text{``HHLL''}$$

According to the rule of FIG. 4, this means that the light emitting element 6 in the forward edge detecting sensor 4 is adapted to receive pulsed light emission and the light emitting elements 6 in the other photosensors 3 and 5 are turned off. Therefore, the elector 21 operates to supply the pulse voltage PL to the forward edge detecting sensor 4, while the continuous OFF voltage is supplied to the width detecting sensors 3 and the discharge detecting sensor 5. Thus, only the light emitting element 6 in the forward edge detecting sensor 4 periodically performs pulsed light emission in accordance with the pulse train of FIG. 6, while the other photosensors 3 and 5 remain turned off.

On the other hand, the light receiving signal $A_4$ from the forward edge detecting sensor 4 becomes a latch output $AL_4$ through the F/F circuit 24, to be supplied to the data selector 26. Latch timing in the F/F circuit 24 is determined by timing of the pulse voltage PL. The light receiving signal $A_4$ is directly supplied as other data input of the data selector 26.

Second lower order data bit $C_2$ within the light emission control signals C is supplied as a selection signal for the data selector 26. The latch output $AL_4$ is selected in the case of the pulse emission as herein considered, i.e., when $C_2 = \text{``L''}$, to be outputted to the sensor output reading circuit 13 as a sensor output signal $D_4$. Determination in the sensor output reading circuit 13 as to which sensor detects light is performed by the rule of FIG. 5.

Consider such a case wherein the film 1 of FIG. 1A is gradually downwardly carried so that its forward edge 42 reaches the position of the forward edge detecting sensor 4 at a time $t_1$. Then, the film 1 is "present" in the position of the forward edge detecting sensor 4 after $t = t_1$, as shown in FIG. 8(a). The light receiving signal $A_4$ is activated ($G_1$ in FIG. 8(c)) in first pulse light emission ($F_1$ in FIG. 8(b)) after $t = t_1$, to be latched in the F/F circuit 24 ($H_1$ in FIG. 8(d)). The latch output $AL_4$ is applied as the sensor output signal $D_4$. Thus, the sensor output reading circuit 13 performs forward edge detection at a time $t_2$ in FIG. 8(d).

When a rear edge 43 (refer to FIG. 1A) of the film 1 passes through the position of the forward edge detecting sensor 4 at $t = t_3$ of FIG. 8(a), the latch output $AL_4$ (FIG. 8(d)) falls in response to first pulse emission $F_2$. Thus, the respective circuits return to initial states. Since pulse light emission is appropriately performed in this operation by setting its width and interval using the rule (5), (6) or (7), the film 1 is not substantially sensitized.

While the above description has been made for the case of performing only forward edge detection, the following description is made for the case of turning off light emission upon forward edge detection. FIG. 9 is a timing chart of this case, while operation to forward edge detection at $t=t_2$ is similar to that in FIG. 8. In this case, however, the sensor output reading circuit 13 applies a light emission switching signal W upon forward edge detection at $t=t_2$ to the light emission control circuit 12. Thus, the light emission control circuit 12 switches the light emission control signal C to "HH*H", where the symbol "*" indicates either "H" or "L". As a result, the forward edge detecting sensor 4 is supplied with a continuous OFF voltage in accordance with FIG. 4, to be disabled. Thus, the light emitting element 6 in the forward edge detecting sensor 4 is turned off, and thereafter light emitting receiving operation of the forward edge detecting sensor 4 is terminated (FIG. 9(a) and 9(b)).

When the pulse generator 22 generates a subsequent pulse (not shown), the light receiving signal $A_4 (="L")$ is latched, and the latch output signal $AL_4$ returns at $t=t_4$ as shown in FIG. 9(d). Thus, forward edge detection and turn off of emission by the same are completed. Although only emission turn off is performed in this case, movement of the film 1 may be stopped at the same time.

Figure 10:
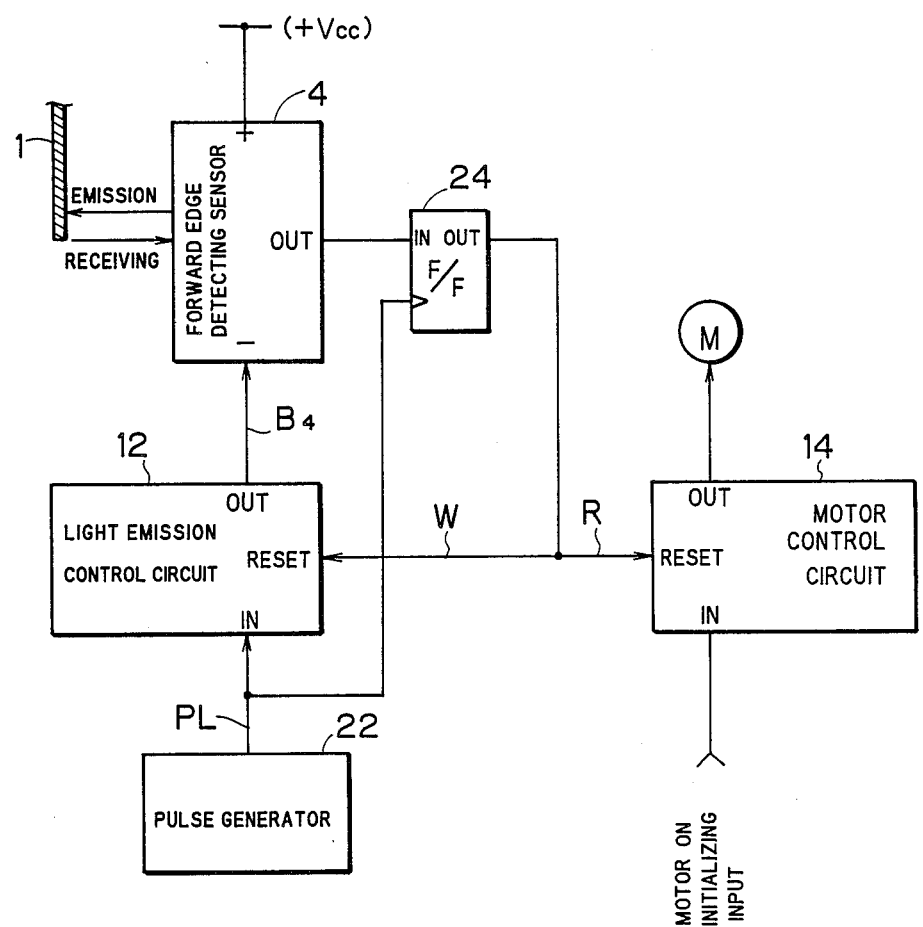
FIGS. 10 and 12 are block diagrams of edge detection dedicated circuits using pulsed light emission and continuous light emission, respectively.

An apparatus as shown in FIG. 10 may be employed as a dedicated apparatus for performing only the aforementioned forward edge detection by pulse light emission. In this case, the light emission signal $B_4$ is directly outputted from the light emission control circuit 12.

D. Foward Edge Detecting Operation (Continuous Emission)

In the apparatus shown in FIGS. 1A and 1B, detecting operation such as foward edge detection can be also performed by continuous light emission, in addition to detection by pulse light emission. Description is now made of forward edge detecting operation by continuous emission.

In this case, the light emission control circuit 12 of FIG. 1A outputs:

$$C = \text{"HHHL"}$$

as the light emission signal C, in response to an external selection input signal (not shown). Then, the selector 21 performs a selecting operation using the relation of FIG. 4, to supply a continuous ON voltage for continuous light emission to the forward edge detecting sensor 4. As a result, the forward edge detecting sensor 4 continuously emits light. The data selector 26, being supplied with the signal $C_2="H"$, selects the light receiving signal $A_4$ from the forward edge detecting sensor 4 to output the same.

Therefore, when the forward edge 42 of the film 1 reaches the position of the forward edge detecting sensor 4 at a time $t=t_{10}$, the level of the light receiving signal $A_4$ goes high (FIG. 1B). The light receiving signal $A_4$ is supplied directly to the sensor output reading circuit 13 as the sensor output signal $D_4$. Then, the sensor output reading circuit 13 outputs the light emission switching signal W similarly to the aforementioned case of pulse light emission, whereby the light emission control signal C becomes:

$$C = \text{"HH*H"} \text{ (all off)}$$

Figure 11:
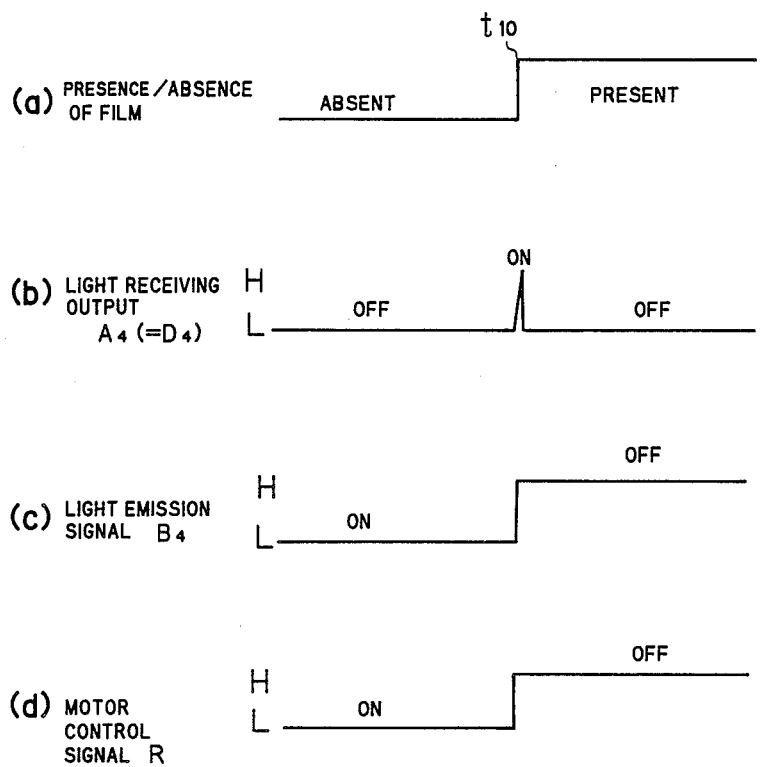
FIG. 11 is a timing chart forward edge detection using continuous light emission.

Thus, light emission of the forward edge detecting sensor 4 is turned off (FIG. 11(c)). The motor control signal R also indicates a stop (FIG. 11(d)), and the motor M stops in response thereto.

Figure 12:
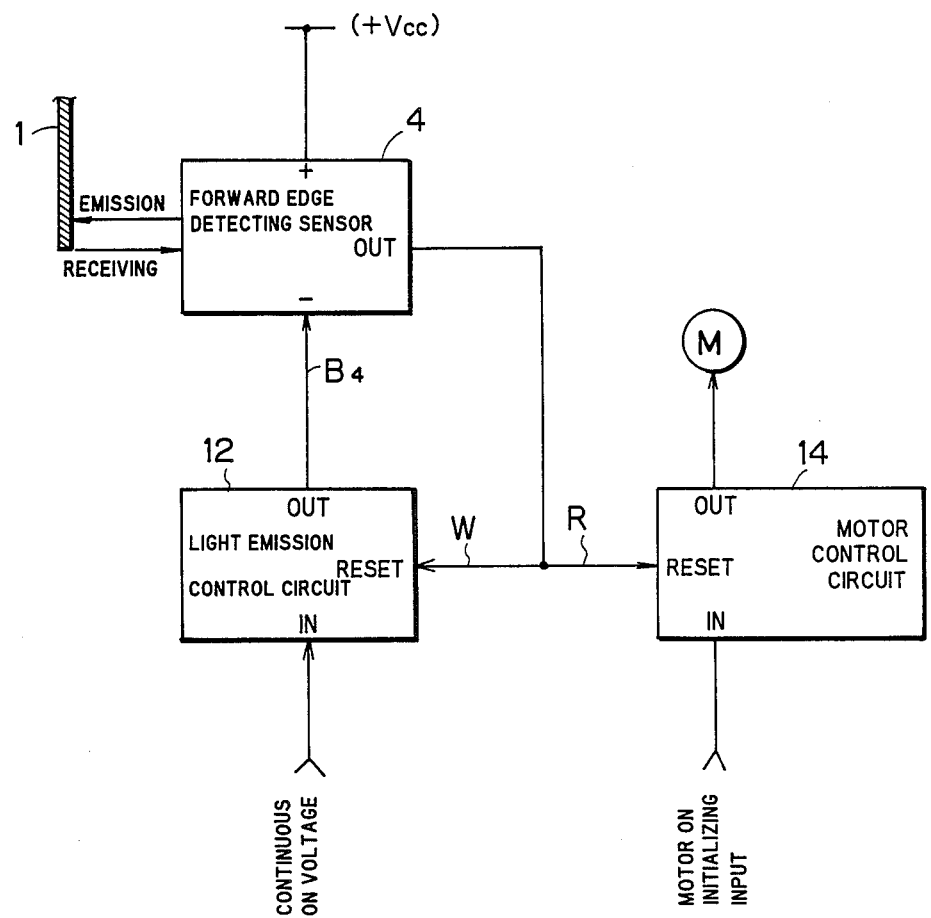

Forward edge detection by continuous light emission and stoppage of emission/carriage are thus executed. Since the detection by continuous light emission is combined with the aforementioned stopping operation, the light emission is also stopped immediately after detection light is first applied to the film 1. As a result, the film 1 can be prevented from being sensitized. FIG. 12 shows a dedicated circuit substantially relating to the continuous light emission mode obtained by extracting only a portion from the apparatus of FIG. 1B.

E. Terminating Edge Detection (Discharge Detection)

Operation for detecting a terminating edge 43 (refer to FIG. 1A) of the film 1 through the apparatus of FIG. 1B is substantially similar to that in the case of the aforementioned forward edge detection (periodic pulse light emission) except that the discharge detecting sensor 5 is employed to carry out terminating edge detection in response to falling of the sensor output signal $D_5$. Namely, assuming that the light emission control signal C is:

$$C = \text{"LH*H"},$$

only the discharge detecting sensor 5 performs pulse light emission. The operation in this case is obtained by replacing:

$$B_4 \rightarrow B_5, A_4 \rightarrow A_5$$

$$AL_4 \rightarrow AL_5, D_4 \rightarrow D_5$$

in FIG. 8. Therefore, when the terminating edge 43 passes through the position of the discharge detecting sensor 5 at $t=t_3$, terminating edge detection is performed at $t=t_4$.

F. Width Detection

In order to perform width detection of the film 1, the light emission control signal C is set to be:

$$C = \text{"HL*H"}$$

Then, in accordance with the relation of FIG. 4, the selector 21 outputs the pulse voltage PL as the light emission signal $B_3$ for the width detecting sensors $3a$ to $3c$.

Figure 13:
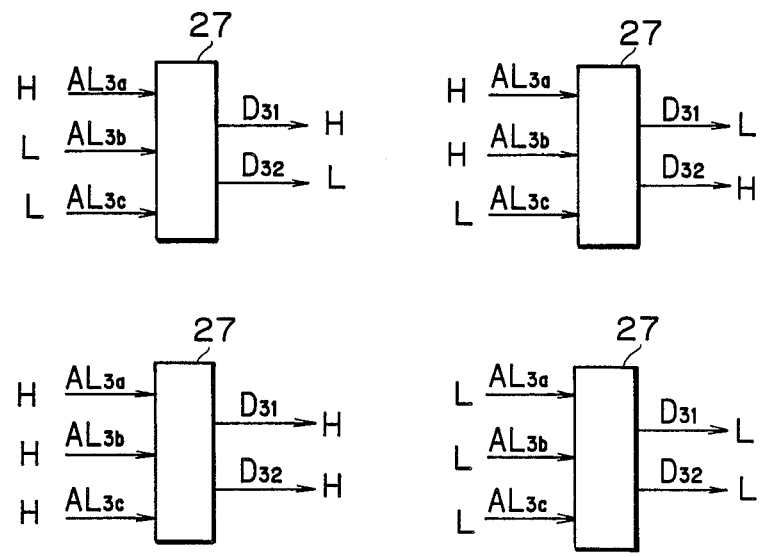
FIG. 13 is a diagram illustrating an encoding rule in an encoding circuit 27.

The light receiving signals $A_{3a}$ to $A_{3c}$ from the width detecting sensors $3a$ to $3c$ are latched by the F/F circuits $23a$ to $23c$, to become latch outputs $AL_{3a}$ to $AL_{3c}$. The three-bit signals are converted by the encoding circuit 27 to two-bit sensor output signals $D_3$, and FIG. 13 shows the encoding rule thereof.

Figure 14A:
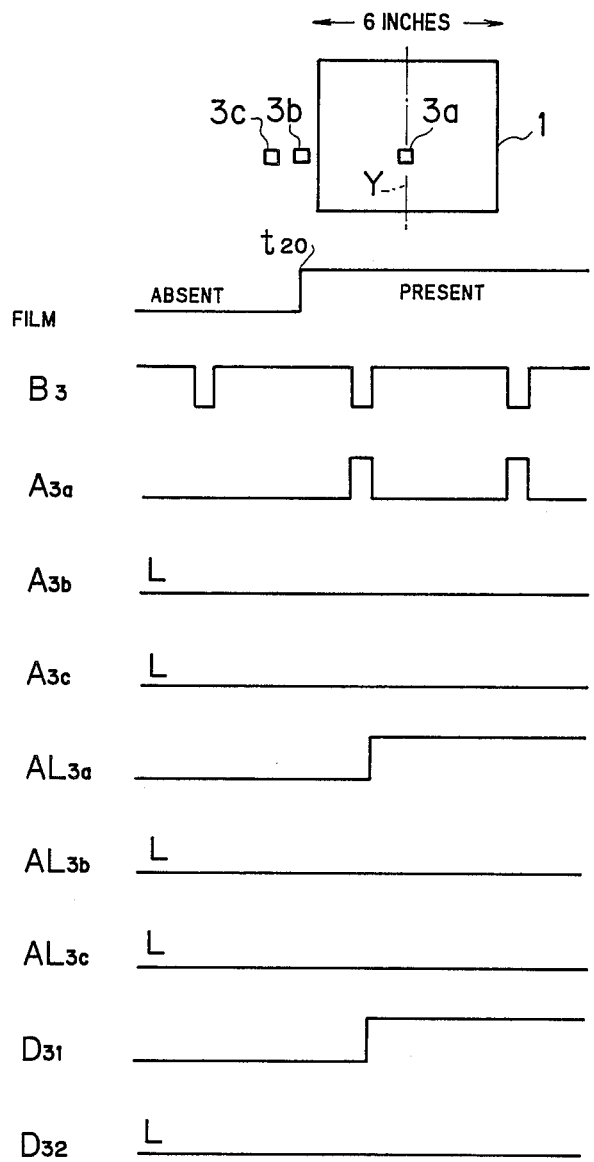
FIG. 14 is a diagram showing width detecting operation according to the preferred embodiment.
Figure 14B:
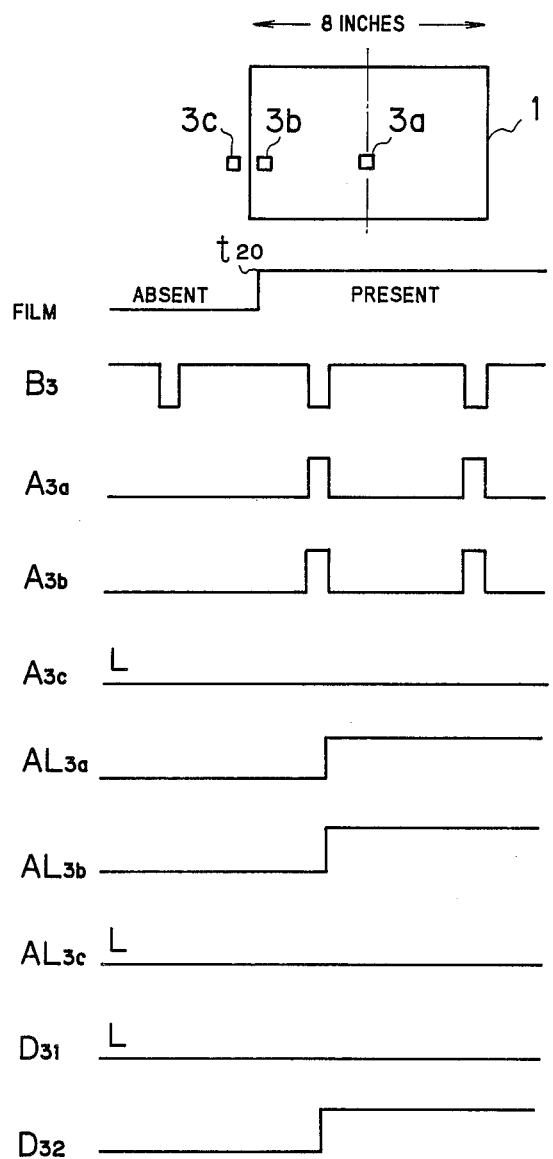
Figure 14C:
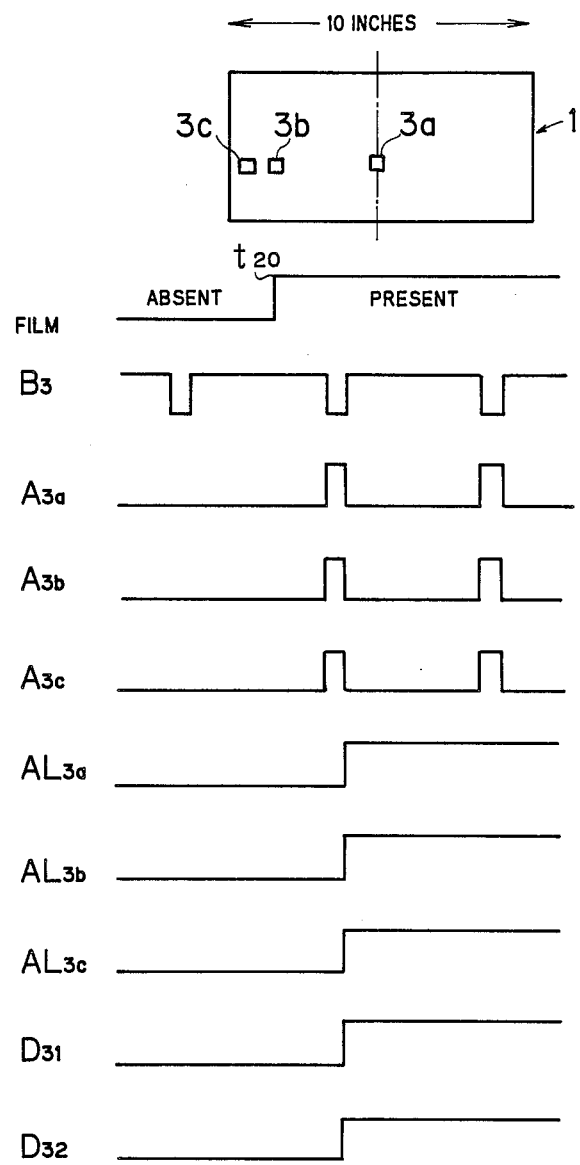

Therefore, when it is assumed that three types of films 6 inches (15.24 cm), 8 inches (20.32 cm) or 10 inches (25.4 cm) in width is provided with displacement values $l_1$ and $l_2$ in FIG. 1A of $l_1=3.5$ inches (8.75 cm) and $l_2=4.5$ inches (11.43 cm), combinations of levels of sensor output signals $D_{31}$ and $D_{32}$, as shown in FIGS. 14A to 14C, are obtained for the respective films. Referring to FIG. 14, $t=t_{20}$ indicates a time at which the forward edge 42 of the film 1 reaches the location of the width detecting sensors 3. When the sensor output signals $D_{31}$ and $D_{32}$ are decoded in the sensor output reading circuit 13, in accordance with the rule of FIG. 5, the width of the film 1 can be detected. Light emission of the light emitting elements 6 in the photosensors 3 or rotation of the motor M can be stopped as needed, similarly to the case of forward edge detection.

Also in the case of width detection, the activation time $T_D$ and activation interval $T_I$ for the light emitting elements 6 in the three width detecting sensors 3a to 3c are set in accordance with the expression (5) or (7), whereby the film 1 is not substantially sensitized.

G. Results of Actual Measurement

Experiments have been made to confirm the degree of sensitization in the case of such photosensitive material detection.

(a) Conditions (1) Film 1 ... Near infrared process film having the photosensitive characteristic of FIG. 3B and standard photosensitivity of 5 $\mu J/cm^2$ with respect to 0.1 $\mu sec$. Employed were halftone films subjected to exposure at halftone dot area rates of 50% and 16%, in order to observe influence to exposed films. The diameter of a single light spot for exposure employed for forming the halftone dots was about 21 $\mu m$ (exposure wavelength: 780 to 800 nm). At this time, exposure was performed for $10^{-7}$ sec. with each exposure beam, and exposure beam intensity was about 220 $\mu W/sec$.

(2) Photosensor (light emitting element 6) ... The photosensor employed is one comprising a light emitting element having a wavelength band corresponding to FIG. 3A with a peak at 940 nm, whose measured value of light emission intensity in 950 nm wavelength is about 34 W/sec.

(3) Distance between Photosensor and Film Surface . . . 5 mm (4) Pulse Voltage Waveform ... Pulses having an activation period $(T_D + T_I)$ of 1 sec. and an activation time $T_D$ of 1 msec. Actual measurement was also performed with a one-shot pulse having another activation time as $T_D$, for the purpose of comparison.

(b) Results (1) In the case of 50% halftone dot, $T_D = 0.2$ to 0.3 sec. is required to perform such photosensitization that the halftone dot is increased in size by emission of the light emitting element. On the other hand, there was no substantial influence with $T_D = 1$ msec., as in the preferred embodiment. The latter is about 1/200 to 1/300 of the former, and the problem of sensitization is for practical purposes prevented.

(2) In the case of 16% halftone dots, no influence was observed with 1 msec., and no sensitization was practically performed with $T_D = 10$ msec. and 100 msec. This applied to both microscopic observation and densitometer measurement. The base of the halfdot was blackened to some extent with $T_D = 1$ sec., and the optical density value was increased by about (+0.02).

With these results, it has been experimentally ascertained that the exposure value of a film by light emission of the photosensor of the preferred embodiment is less than critical exposure value when $T_D$ is about 1 msec., and photosensitization by the same is negligible.

H. Modifications

Although forward edge detection and width detection are independently performed in the aforementioned embodiment, the same may be simultaneously performed. Various control and detection may be performed through a microcomputer. The activation time and the activation interval for the light emitting elements in pulse light emission are preferably as small as possible so far as the conditions of the present invention are satisfied and effective light receiving signals are obtained, since detection errors in forward edge detection and the like are reduced as the values of the activation time and interval are decreased.

Although pulse light emission and continuous light emission can be arbitrarily selected in the example shown in FIG. 1B, an apparatus having only one function within the same is also employable. When these are combined, generality of the apparatus is further improved since highly accurate detection in continuous light emission and low photosensitivity in pulse light emission can be freely selected in a single apparatus. In order to stop carriage of a film, first and second photosensors can be provided for forward edge detection to roughly detect presence or absence by pulse light emission of a light emitting element in the first photosensor and thereafter perform continuous light emission of the second photosensor, thereby to perform fine adjustment of the position of stoppage of the film.

Confirmation as to whether or not accumulated exposure value by pulse light emission with a trial waveform is less than critical exposure value may be either theroretically or experimentally performed, and an actual waveform is determined on the basis of a confirmation.

In the case of carrying a photosensitive object while always aligning a side edge with a specific line but not about the carriage center line Y as in the aforementioned embodiment, the specific line is employed as a "carriage reference line".

When only two types of films, 6 inches and 8 inches, are employed, the photosensor 3c may be omitted. In the case of two types of films, 8 inches and 10 inches, the photosensor 3a or 3b may be omitted. Namely, one or a plurality of photosensors may be provided in response to the number of widths of the employed photosensitive objects.

In the example as shown in FIG. 1A, the photosensors 3a, 4 and 5 are provided facing the carrier reference line and a portion of the photosensitive surface of the film 1 located on the carrier reference line receives the light from the photosensors 3a, 4 and 5 during carriage on the path. In this case, therefore, pulsed light which makes the sum of respective accumulated exposure values from the photosensors 3a, 4 and 5 less than the critical exposure, is employed. It has been experimentally confirmed that the aforementioned example $(T_D + T_I = 1$ sec, $T_D = 1$ msec.) satisfies this condition too. However, such a condition may not be considered if the positional relation between the photosensors 3a, 4 and 5 and the carrier reference line is displaced slightly.

The light emitting elements 6 and the light receiving elements 7 may be oppositely provided so that a film passes between these elements and light enters the light receiving elements 7 when a film 43 is present between these elements. In this case, the light receiving element 7 faces the light emitting element 6 across the center line Y.

In addition to the photographic film, the present invention is applicable to other photosensitive objects such as a photographic dry plate. Further, the present invention is applicable to an automatic developing machine etc., in addition to a process camera.

According to the present invention, as hereinabove described, light emitting means are made to perform pulsed light emission for detecting a photosensitive object, while activation time and activation interval of the emitted light pulses are appropriately selected using a prescribed rule, whereby a photosensitive object detecting method capable of detecting presence or absence of the photosensitive object without substantial sensitizing of the photosensitive object can be obtained. Further, light emitting elements generating light within a non-photosensitive wavelength may not be used but white light emitting means, for example, may be employed for detecting various photosensitive materials, whereby a photosensitive object detecting apparatus can be formed at a low cost.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for optically detecting a photosensitive object having photosensitive material carried along a prescribed path at a prescribed position along said path, said apparatus comprising:
    light emitting means facing said prescribed position;
    first power supply means for supplying pulsed power to said light emitting means thereby to activate said light emitting means to emit pulsed light, an activation time and an activation interval of said pulsed power being determined to satisfy such a condition that an accumulated exposure value in each portion on said photosensitive object is less than a critical exposure value of said photosensitive material depending on a photosensitive character of said photosensitive material when said pulsed light is applied to said photosensitive object being moved;
    second power supply means for supplying continuous power to said light emitting means thereby to activate said light emitting means to emit continuous light;
    selection means for selectively enabling one of said first and second power supply means in response to an externally supplied selection signal thereby to activate said light emitting means selectively to emit one of said pulsed light and said continuous light; and
    light receiving means facing said prescribed position for receiving light emitted from said light emitting means thereby to generate a photosensitive object detection signal indicating whether or not said photosensitive object is present at said prescribed position.

2. An apparatus in accordance with claim 1, further including disabling means for disabling said first or second power supply means selected by said selected means when said photosensitive object detection signal indicates a presence of said photosensitive object.

3. An apparatus in accordance with claim 2, wherein said apparatus is an edge detecting apparatus for detecting the edge of said photosensitive object, said apparatus further including stop signal generating means for generating a stop signal for stopping movement of said photosensitive object when said photosensitive object detection signal indicates a presence of said photosensitive object.

4. An apparatus in accordance with claim 2, wherein said light emitting means and said light receiving means include a light emitting element and a light receiving element provided at positions displaced from a center line of said path for carrying said photosensitive object, respectively, and said apparatus being adapted to detect a width of said photosensitive object.

5. A method of optically detecting an edge of a photosensitive object having a photosensitive material carried along a prescribed path at a prescribed position in said path using light emitting means and light receiving means at positions facing said prescribed positions of said path, said method comprising the steps of:
    selectively supplying pulsed and continuous power to said light emitting means in response to an externally supplied selection signal thereby to selectively activate said light emitting means to emit pulsed and continuous light, respectively, an activation time and an activation interval of said selectively emitted pulsed and continuous power being such that an accumulated exposure value in each portion on said photosensitive object is less than a critical exposure value of said photosensitive material;
    receiving said pulsed selectively emitted pulsed and continuous light by said light receiving means; and
    detecting said edge of said photosensitive object reaching a position across an emission path of said selectively emitted pulsed and continuous light by observing an output of said light receiving means.

6. A method in accordance with claim 5, further including a step of stopping a supply of said pulsed and continuous power to said light emitting means after a detection of said edge.

7. A method in accordance with claim 6, further including a step of stopping movement of said photosensitive object after a detection of said edge.

8. A method of optically detecting a width of a photosensitive object having a photosensitive material carried along a prescribed path at a prescribed position of said path using light emitting means and light receiving means at positions displaced by predetermined distances from a center line of said path, said method comprising the steps of:
    selectively supplying pulsed and continuous power to said light emitting means in response to an externally supplied selection signal to selectively activate said light emitting means to emit pulsed and continuous light, respectively, an activation time and an activation interval of said pulsed and continuous power being such that an accumulated exposure value in each portion on said photosensitive object is less than a critical exposure value of said photosensitive material;
    receiving said light selectively emitted by said light emitting means by said light receiving means; and
    detecting a width of said photosensitive object by observing an output of said light receiving means.

9. A method in accordance with claim 8, further including a step of stopping a supply of said pulsed and continuous power to said light emitting means after a detection of said width.

* * * * *